United States Patent [19]

Bayonnet et al.

[11] Patent Number: 4,914,869
[45] Date of Patent: Apr. 10, 1990

[54] METHOD FOR CORRECTING AND BUFFING TIRES

[75] Inventors: Jack L. Bayonnet; Bernard T. Zuk, both of Summit County; Robert L. Brown, Portage County, all of Ohio

[73] Assignee: General Tire, Inc., Akron, Ohio

[21] Appl. No.: 194,652

[22] Filed: May 16, 1988

[51] Int. Cl.$^4$ ............................................. B24B 49/00
[52] U.S. Cl. ............................... 51/165 R; 51/165.8; 51/106 R; 51/281 R; 51/DIG. 33; 82/1.11; 82/118; 409/166
[58] Field of Search ............... 51/106, 165 R, 165.71, 51/165.8, 281 R, DIG. 33, 289 R; 82/1 C, 2 B, 47, 48, 49, 51; 409/166; 157/13

[56] References Cited

U.S. PATENT DOCUMENTS

| | | | |
|---|---|---|---|
| 3,724,137 | 4/1973 | Hofelt, Jr. et al. | 51/106 R |
| 3,739,533 | 6/1973 | Iida et al. | 51/165 R X |
| 3,818,642 | 6/1974 | Seidel | 51/165.8 |
| 3,841,033 | 10/1974 | Appleby et al. | 51/165.91 X |
| 3,841,034 | 10/1974 | Held | 51/DIG. 33 |
| 3,848,368 | 11/1974 | Toshioka et al. | 51/165 R |
| 3,914,907 | 10/1975 | Hofelt, Jr. et al. | 51/DIG. 33 |
| 4,041,647 | 8/1977 | Ugo | 51/106 R |
| 4,084,350 | 4/1978 | Ongaro | 51/165 R X |
| 4,112,630 | 9/1978 | Brown, Jr. | 51/165 R X |
| 4,458,451 | 7/1984 | Rogers et al. | 51/165 R |

Primary Examiner—Robert P. Olszewski

[57] ABSTRACT

An improved apparatus and method are provided for cutting a tire surface to remove selected portions of rubber from the tire surface while the tire is rotating. The apparatus and method are especially useful in removing tread material from the tire to improve the force variation and runout characteristics of the tire. The material is removed by a cutting device such as a grinding wheel and a positioning device which holds the cutting device in a fixed cutting position for an incremental period of time while a corresponding incremental segment of the tire circumference, for instance a segment equal to 1/100 of the circumference (3.6°), passes by the cutter. A sensing device measures a characteristic of the tire, such as its radial forced variation, and radial run-out of the tire is also measured. Based on these measurements, a computing device determines the amount of material to be removed from each incremental segment of the tire circumference and controls the positioning device so that the cutter is located in the correct position for removing the desired amount of material from each incremental segment of the tire circumference.

6 Claims, 9 Drawing Sheets

METHOD FOR CORRECTING AND BUFFING TIRES

FIELD OF THE INVENTION

This invention relates to an improved apparatus and method for removing selected portions of material from a tire surface while the tire is rotating. The invention is particularly applicable to grinding the tread surface of a tire to improve its force variation characteristics, and may also be used to improve the tire's run-out, or out-of-roundness characteristic, as well as its conicity.

BACKGROUND OF THE INVENTION

The correction of tires to reduce force variations is called "tire uniformity optimization" or "TUO", and is disclosed in a number of publications including U.S. Pat. Nos. 3,724,137; 3,725,163; 3,849,942; 3,914,907 and 4,047,338. The apparatus of these patents all sense force variations imparted by a tire rotating against a load drum. They also generate electrical signals representing these force variations. In response to those signals, the methods and apparatus of all except the '163 patent move a grinding wheel into and out of cutting engagement with the tread surface of a tire. Because the force variations are caused by variations in the stiffness and geometrical dimensions of the tire about its circumference, the portions of the circumference where the force transmitted between the tire and the load drum is excessively high in relation to other portions may be corrected by removing rubber from the tire tread. This rubber removal reduces the tire's stiffness and tread thickness in these portions and consequently reduces the amount of force transmitted to levels closer to the force transmitted in other areas. In the method of the '163 patent, additional rubbery material is applied to the tread surface in areas of low force transmission instead of being removed in areas where the force is high.

In previous methods and apparatus for correcting force variations that employ rubber grinding or other cutting devices, such as those shown in the '137, '907, '338 and '942 patents referred to above, hydraulic pistons are used to move the grinding wheels into and out of engagement with the tread rubber. The pistons locate the grinding wheels at the desired cutting depths and are moved by pressurized hydraulic fluid. The fluid is controlled by a servo system that is designed to move the pistons and grinding wheels to their correct grinding positions. However, while the pressurized fluid pushes the grinding wheels in one direction, the tire being buffed pushes back on the grinding wheels; so the exact positioning of the pistons and grinding wheels is determined by a balancing of the pressure in the hydraulic system to position the grind wheel. Also, the pistons can be delayed and can oscillate as they travel to their full cutting depth during this hydraulic pressure/tire force balancing. Thus, one problem with using hydraulic pistons to locate the grinding wheels is that the wheels cannot be set at accurately fixed, predetermined cutting depths at the exact locations of the tire circumference where rubber removal is desired.

Another problem with the previous tire uniformity optimization systems is that the positioning of the grinding wheel is made without reference to the actual position of the surface of the tire where the grinding takes place. The run-out of the tire determines where the surface of the tire is at any given location of grinding, and must be taken into consideration in determining where to locate the grinding wheels to remove a desired thickness of rubber. While some previous systems use the run-out measurement to determine how much hydraulic pressure to apply to the pistons, this is for the purpose of reducing the areas of high run-out, a process which is called "tire trueing". However, this is not the same as using the run-out measurement to establish a reference position for the grinding wheels at each circumferential location on the tire, so that the grinding wheels can be moved inwardly from that reference position by the exact distance equal to the depth of the cutting desired at that location.

Still another problem with previous tire uniformity optimization methods and apparatus is that they are carried out at high speeds, usually about 60 revolutions per minute. While for a passenger tire this is equivalent to running at only about 5 miles per hour, that is a relatively fast speed for correcting tires for non-uniformities. Errors caused by grinding too much or too little or in the wrong areas can occur, and the final appearance of the tire can suffer because each circumferential portion being ground moves by the grinding wheel at a relatively fast rate, resulting in fewer passes of the grinding wheel during each pass of the tread portion. Consequently, a rougher grind is produced.

SUMMARY OF THE INVENTION

An object of the invention is to provide an apparatus for removing rubber from tires in which the cutting device that removes the rubber is accurately controlled and produces a smooth surface on the cut portions of the tire.

Another object of the invention is to provide a tire uniformity correction apparatus that accurately controls the grinding wheel or other cutting device that is used to remove the rubber in response to force variation measurements taken on the tire.

Yet another object of the invention is to provide a method of correcting tire uniformity in which a grinding wheel or other cutting device is accurately controlled to remove the desired thickness of rubber from the tire tread.

Still another object of the invention is to provide a method of grinding or cutting material from tires in which the tire is rotated at a relatively slow speed compared to speeds normally used for grinding and measuring force variations of tires, so that a relatively smooth surface is produced on the cut portions of the tire.

These and other objects and advantages are obtained by an apparatus and method in which a positioning means is designed to hold a cutting device in a fixed, accurately determined position relative to the tire surface for a predetermined increment of distance and is also designed to be varied during successive intervals corresponding to successive increments of the tire circumference. A computing device receives electrical signals representative of circumferential variations in a characteristic of the tire, and determines, based on these signals, the placement of the cutting device relative to the tire surface for each distance interval corresponding to an increment of the tire circumference. The computing device is connected to the positioning means and controls the positioning means to locate the cutting device at its proper location in each increment of the tire circumference, so as to remove the desired amount of material from each of these increments.

In one embodiment of the invention, a load wheel is movable into loaded engagement with the tread surface of the tire, and a load cell measures the variations in force transmitted between the tire and the load wheel. The electric signal generating means generates signals proportional to the force variations and the cutting device is in the form of a grinding wheel which removes rubber from the tire to reduce the force variations.

According to the method of the invention, force variations in a tire are reduced by measuring the magnitudes and locations of the force variations, and calculating from these measurements the depth of cutting required in each of a plurality of increments of the tire circumference. The radial run-out of the tire is also measured, and in response to the run-out measurements and cutting depth calculations, a cutting device is molded into engagement with the rotating tire at the calculated cutting depth relative to the run-out measurement at each increment of the tire circumference.

DESCRIPTION OF PREFERRED EMBODIMENTS

Figure 1:
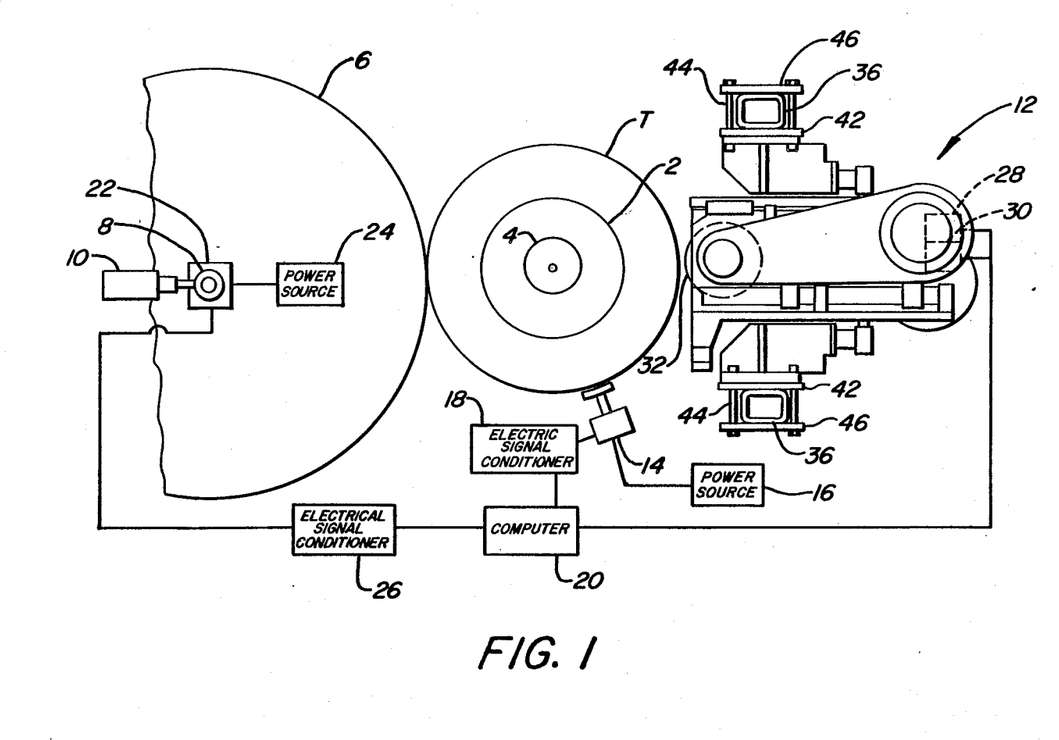
FIG. 1 is a top schematic view of a tire, a load drum and a tire uniformity optimization apparatus illustrating one embodiment of the present invention.

In FIG. 1, a tire T is mounted and inflated on a rim. A variable speed motor 4 rotates the tire T about its axis. The tire T is shown under load provided by a load wheel 6, rotatably supported on bearing blocks 8 on either side of the wheel. The blocks 8 are movable by electric motors 10 which operate by a ball-and-screw connection to bring the wheel 6 into and out of engagement with the tire T. A tire grinding apparatus 12 is located on the opposite side of tire T from load wheel 6.

A radial run-out transducer 14 is shown in FIG. 1 positioned on the surface of the tire T for sensing the variations in the tread diameter around the tire's circumference. The transducer 14 receives power from power source 16 and feeds the run-out signal through a signal conditioner 18 to a computer 20. Preferably a transducer 14 is positioned on each shoulder of the tire, so that the runout of each shoulder can be checked independently.

Load cells 22 are mounted on the axle of load wheel 6 to measure the force transmitted to the tire T as it rotates against the wheel 6. A power source 24 and electric signal conditioner 26 transform the force measurements sensed by the load cells 22 into electric signals which can be received and stored in the computer 20.

The computer 20 stores the electric signals received from the signal conditioner 26, assigning a force value to each of a large number of increments of the tire circumference. Preferably, there are at least 100 such increments and they should be of equal length. Thus in the case of 100 increments, which is a 3.6° arc of the tread. The computer is programmed to determine whether the differences in the force values of the various increments are below the chosen maximum limits beyond which it is not desirable to try to correct the tire. If the tire passes this test, the computer determines how much rubber must be removed from the tread increments having the force values that are too high. These calculations are made using a multiplier factor based on what previous experience with the tire being corrected indicates is the correct depth of cut required to reduce by a certain amount the force transmitted by the tire. This is the type of correction one would use to reduce the composite force variation of the tire. Alternatively, the first harmonic component and/or other harmonic components of the composite force variation pattern may be calculated and the increments to be ground and grinding depths in each increment may be based on the peaks occurring in one or more of these component patterns. The computer can be programmed to make these calculations using mathematical relationships well known in the art.

After the computer calculates the total depth of grinding required for each increment of the tread circumference, it sets the grinding depth at which rubber is to be removed from each increment during each revolution of the tire, according to a preset formula designed to remove relatively large amounts of rubber at the beginning of the grinding and to use smaller finishing cuts near the completion of the grinding. The computer combines these chosen grinding depths with the radial run-out values for each increment being ground to determine where the carriages holding the grinding wheels must be placed to grind the increments at their chosen depths. Based on this information, the computer sends commands to stepper motors 28 and 30 mounted on the apparatus 12 and shown in FIG. 3, to position grinding wheels 32 (FIGS. 1, 2 and 3) and 34 (FIG. 3) in their desired grinding location for each increment of the tire tread passing by them.

Figure 2:
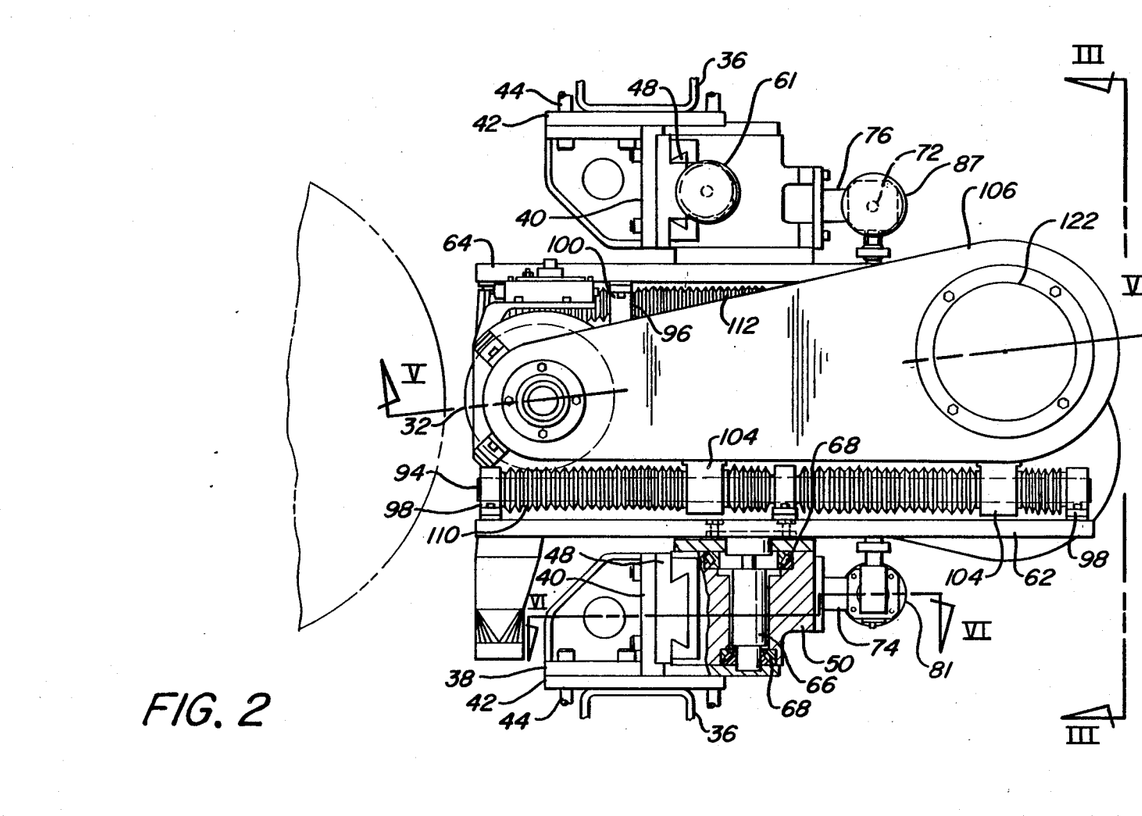
FIG. 2 is an enlarged top view of the tire uniformity optimization apparatus of FIG. 1.
Figure 3:
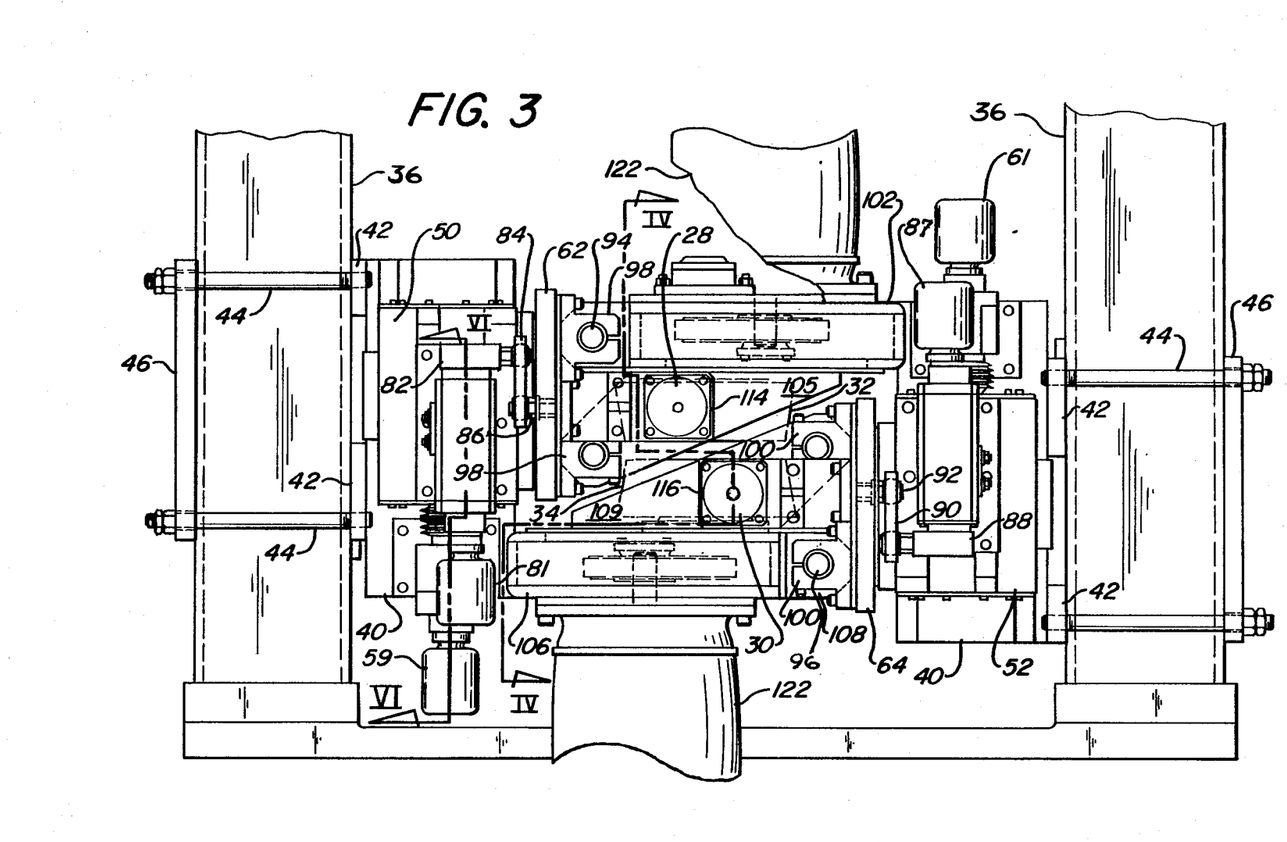
FIG. 3 is a right-end view of the apparatus of FIG. 2, showing the frame on which the apparatus is mounted with a part thereof broken away in section, taken along line III—III of FIG. 2.

The grinding apparatus 12 is supported on column members 36 (FIGS. 1, 2 and 3). As best seen in FIGS. 2, vertical plates 38 and 40 are welded to plates 42 on the inside of each column to form supporting brackets that are held on the column 36 by bolts 44 and plates 46 on the outsides of the columns. Vertical dove tail rails 48 attached to the plates 40 form tracks on which supports 50 and 52 may be independently raised and lowered. As best seen in the sectional view of FIG. 6, the bearing support 50 may be raised and lowered by turning screw 54, which is rotatably held by a bracket 56 connected to plate 40 and threadably engage a collar 58 on bearing support 50. The screw 54 is powered by a stepper motor 59. A screw similar to screw 54 powered by a stepper motor 61 (FIG. 3) may be turned to raise and lower bearing support 52. This adjustment of the bearing supports 50 and 52 allows the grinding wheels 32 and 34 to be spaced at different distances apart to accommodate the grinding of different sizes of tires.

Figure 6:
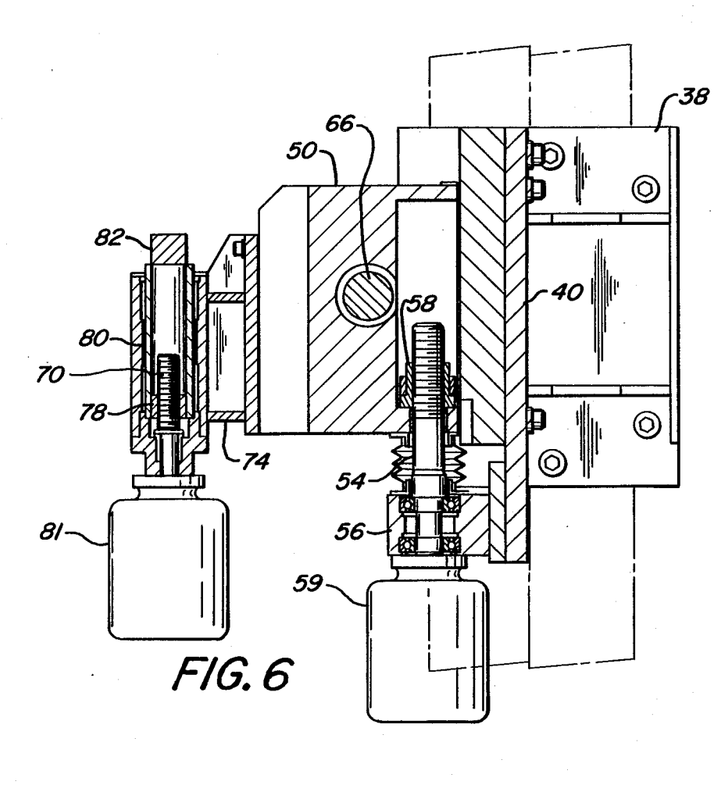
FIG. 6 is a partial sectional view of the apparatus of FIGS. 1 through 5, taken along line VI—VI of FIGS. 2 and 3.

Horizontal frame members 62 and 64 are rotatably mounted on bearing supports 50 and 52 by means of trunions mounted in roller bearings. The trunion 66 and roller bearings 68 mounted on frame member 62 are shown in the partial section of bearing support 50 of FIG. 2. The frame members 62 and 64 may be rotated about their trunions by turning screws 70 and 72, rotatably mounted by brackets 74 and 76 on the sides of bearing supports 50 and 52. As shown in FIG. 6, the screw 70 threadably engages a collar 78 connected to the tube 80. The screw 70 is powered by a stepper motor 81. By turning the screw 70, the tube 80 may be raised or lowered to raise or lower arm 82 fixed to the top of the tube 80. As shown in FIG. 3, a link 84 connects the arm 82 to a pin 86 extending from the side of frame member 62, so that through this linkage, the turning of the screw 70 rotates the frame member 62 about the trunion 66. Likewise, screw 72, powered by a stepper motor 87, may be turned to move arm 88 and connected link 90 which is attached by pin 92 to frame member 64, thus rotating the member 64 about its horizontal trunion, which is not shown in the drawings. The rotation of the horizontal frame member 62 and 64 makes possible the setting of the grinding wheels 32 and 34 at different angles to the centerplane of the tire, so that tires of different tread profiles may be corrected.

Referring to FIGS. 2 and 3, the frame members 62 and 64 each support two round rails 94 and 96 respectively, fastened to the members 62 and 64 by brackets 98 and 100 respectively. Carriage 102 supporting grind wheel 32 is mounted on upper rail 94 by means of a slide bearing 104 and on the lower rail 94 by means of a bracket 105. Carriage 106 supporting grind wheel 34 is mounted on lower rail 96 by means of a slidebearing 108 (FIG. 3) and on the upper rail 96 by means of a bracket 109. As shown in FIG. 2, bellows 110 cover the rails 94 for protection, and they are mounted between the brackets 98 and slide bearings 104. Bellows 112 between brackets 100 and slide bearings 108 protect the rails 96.

Figure 4:
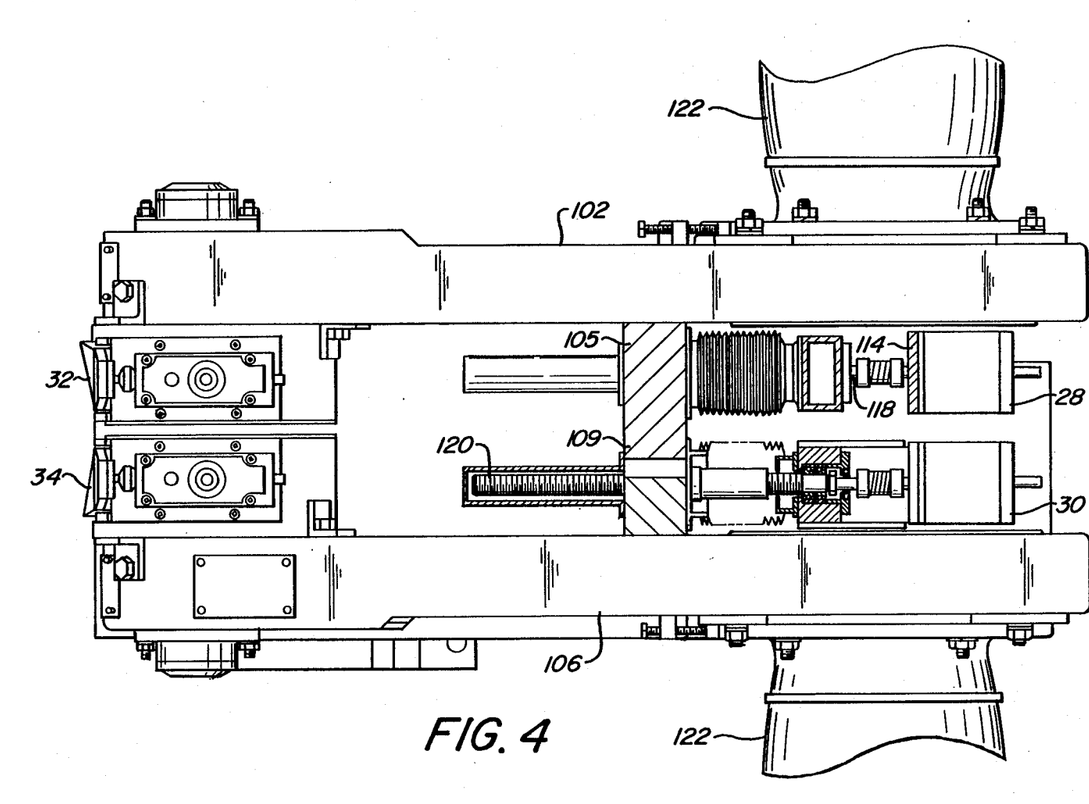
FIG. 4 is a partial view of the apparatus of FIGS. 1 through 3 with portions thereof broken away in section, taken along line IV—IV of FIG. 3.

Referring to FIG. 4, the carriage 102 and 106 are driven along rails 94 and 96 by stepper motors 28 and 30, mounted on frame members 62 and 64 by brackets 114 and 116 respectively. The stepper motors 28 and 30 drive threaded shafts 118 and 120, which engage brackets 105 and 109 to advance or pull back the carriages 102 and 106 to position their respective grinding wheels 32 and 34. The stepper motor 28 and 30 are provided with stop means that enables them to turn the shafts 118 and 120 by precise amounts in response to coded commands.

Because of the threaded screw means of advancing the carriages 102 and 106, the reaction forces caused by pressing the grinding wheels 32 and 34 against the tire T have very little effect on the positioning of the grinding wheels. This enables the apparatus 12 to grind the various increments of the tread circumference to the exact depths desired.

Figure 5:
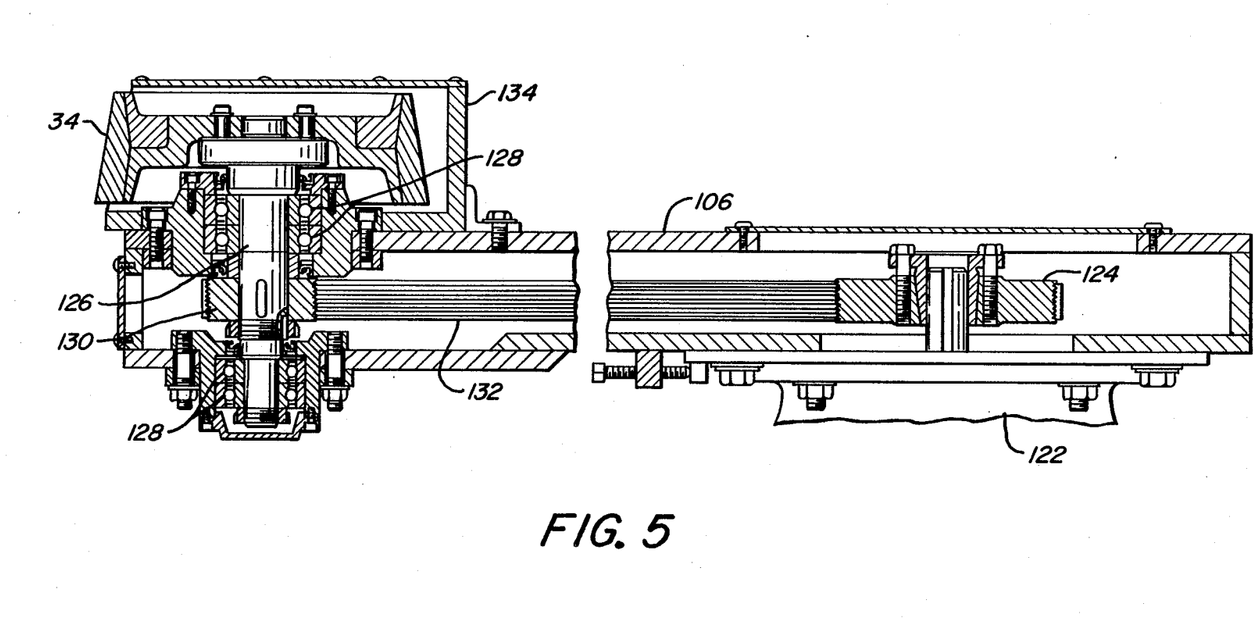
FIG. 5 is a sectional view of a portion of the apparatus of FIGS. 1 through 4, taken along line V—V of FIG. 2.

The drive system for the grinding wheels is illustrated in FIG. 5 for the grind wheel 34. An electric motor 122 mounted on the carriage 106 drives a pulley 124. The grind wheel 34 is fixed to a shaft 126 which is in turn rotatably mounted by ball bearings 128 on the carriage 106. A pulley 130 on the shaft 126 is connected by an endless belt 132 to the motor driven pulley 124. Thus, the motor 122 drives the grinding wheel 34 within its protective housing 134.

Figure 7:
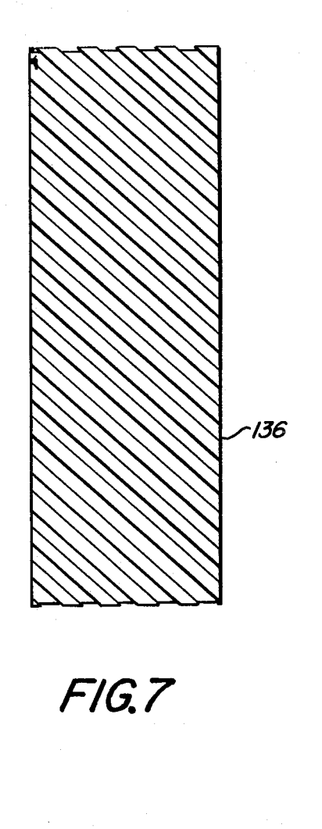
FIGS. 7, 8 and 9 are side views of three cutting devices or grind wheels which are designed for use with the apparatus of FIGS. 1 through 6.
Figure 8:
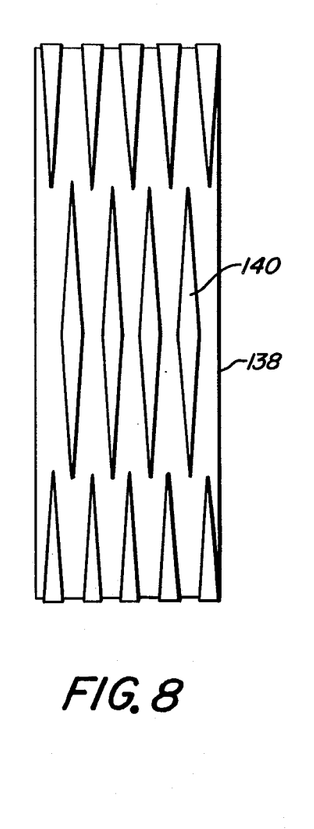

FIGS. 7 and 8 illustrate several grinding wheels 136 and 138 having two types of recommended cutting surfaces. The wheel 136 has spiral cutting edges which shave off the rubber from the tire much like a milling cutter machines a metal surface. The wheel 138 has cutting surfaces that function in a similar manner, but they are arranged in converging relationships to provide elongated separate cutting ridges 140.

Figure 9:
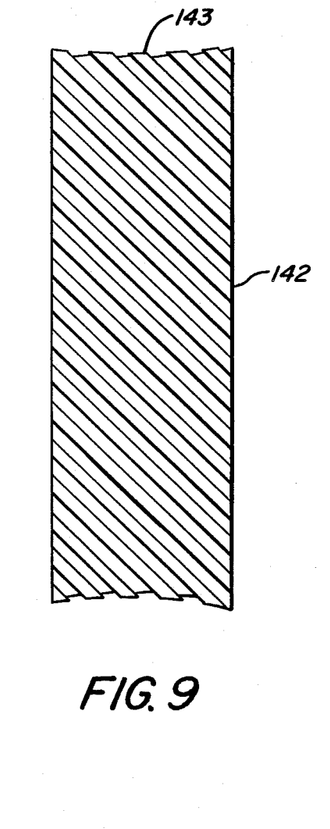

FIG. 9 shows a grinding wheel 142 that has a contoured surface (143) to more closely match the shoulder ribs of a typical radial tire, in order to grind the tread more uniformly and over a wider surface area.

Figure 10:
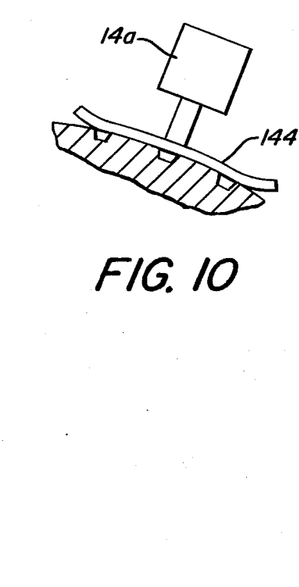
FIG. 10 is a side view of a run-out measuring sensor designed for use with the method of the present invention and with the apparatus of FIGS. 1 through 6.

FIG. 10 illustrates a run-out transducer 14a that is especially designed for measuring the run-out of tires having wide lateral grooves. The transducer is equipped with an elongated curved plate 144 that is designed to bridge the gap between such lateral grooves, so that the transducer will not be subject to sudden impulses by a shorter plate hitting the walls of the grooves.

Figure 11:
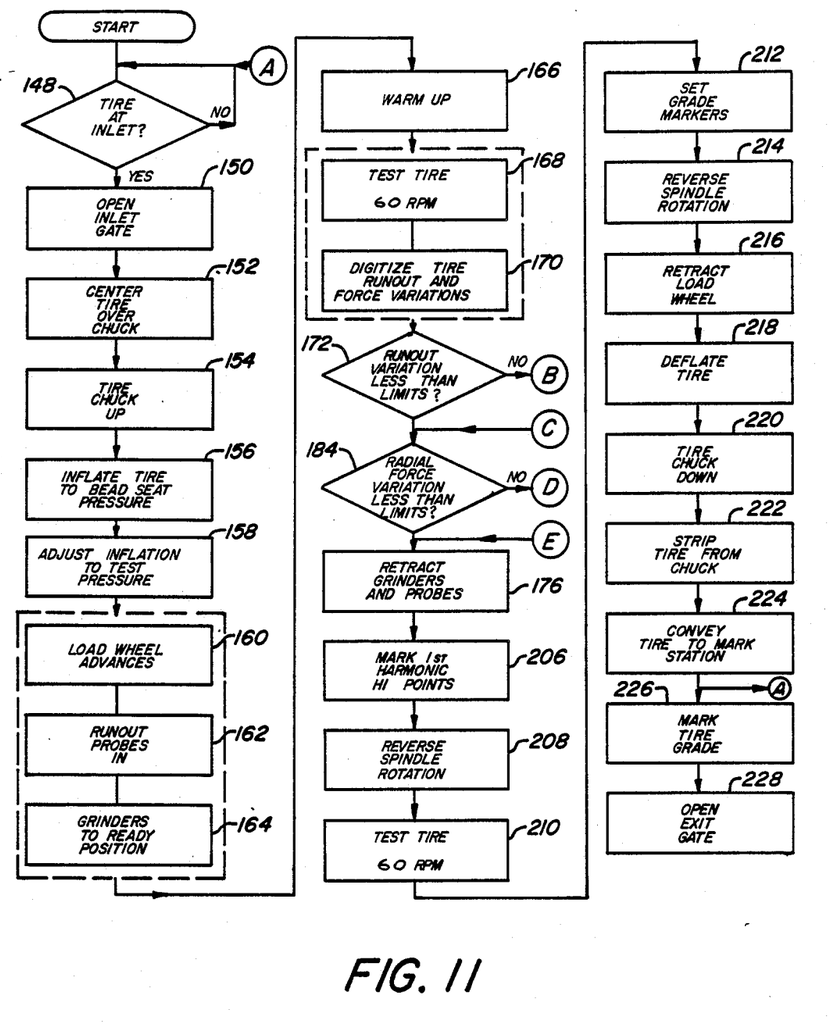
FIGS. 11, 12 and 13 are block diagrams illustrating a preferred method of carrying out the present invention.
Figure 12:
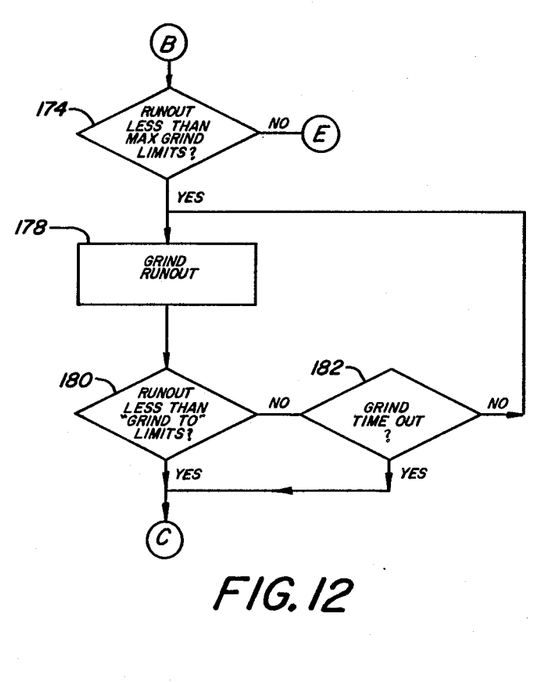
Figure 13:
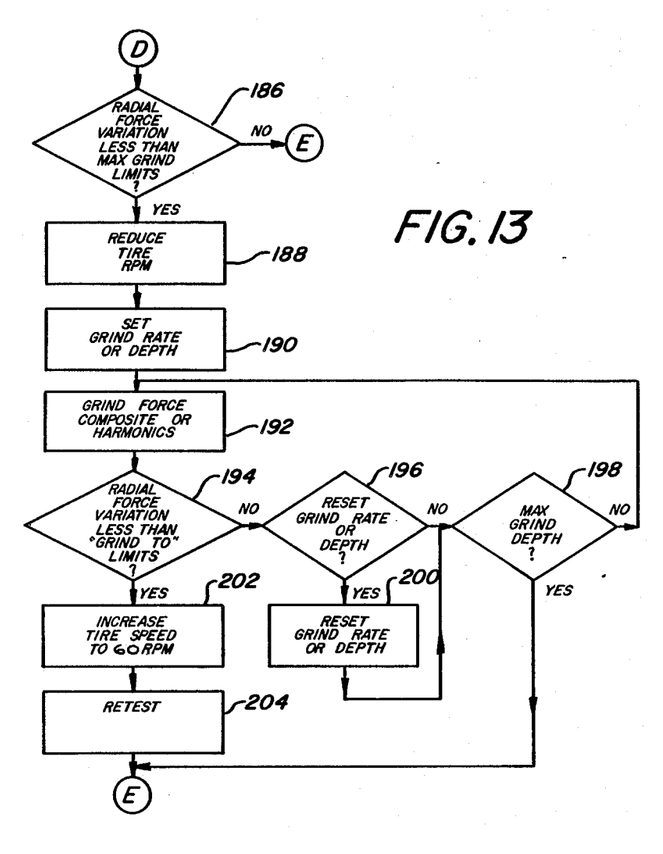

The preferred method of practicing the present invention is illustrated in the diagrams of FIGS. 11, 12 and 13.

As FIG. 11 shows, the tire is conveyed to a check point (148) at an inlet gate. When the tire arrives, the inlet gate opens (150) and the tire is centered over a chuck (152). The chuck moves up to seat the tire on the test rim (154), and the tire is inflated to seat the beads (156). After the beads are seated, the tire is pressurized to its inflation test pressure (158) which for most passenger tires is recommended at 30 PSI. When the tire has reached its test pressure, the motor 10 is operated to move the load wheel 6 into engagement with the tire (160), and one or more run-out probes 14 are moved into their measuring positions on the tread surface (162). The run-out of the tire is received by the computer 20, which commands the stepper motors 28 and 30 to advance the grind wheels 32 and 34 to their "ready" position, (164) spaced a short fixed distance from the tire tread and tracking the tread surface according to the run-out measurement taken by the run-out probes 14.

After a warm-up period (166), the tire is run in clockwise and/or counter clockwise directions at 60 RPM to take another reading of the run-out and also the measure of the force variation pattern of the tire (168). The run-out and force variation signals produce by the run-out and force variation signal conditioners 18 and 26 are digitized by the computer, by assigning a value for each measurement to each of 100 equal increments of the tire circumference (170). The run-out variations are compared with pre-set limits to determine whether the run-out should be corrected (172). If the run-out is not within these limits, it is checked to determine if it is within maximum limits for making it worthwhile to correct the tire (174) (FIG. 12). If the tire fails this test the run-out and force correction steps are by-passed and the grinding wheels and run-out probes are retracted (176). If the run-out variation is below the limits making correction worthwhile, the motors 28 and 30 advance the grinding wheels 32 and 34 to the proper grind depths in the increments where the run-out is too high (178). Preferably, the grinding wheels 32 and 34 are independently controlled by separate signals from transducers 14 on each shoulder of the tire. This will enable the tire to be corrected for conicity, as well as reducing the run-out variation.

After grinding to correct the run-out, and if desired the conicity, these measurements are checked again to determine whether they are below the limits compared in step (172). If not, the amount of time spent on run-out grinding is compared with a maximum grind time, so that too much time is not taken grinding a tire that is difficult to correct for run-out and conicity (182). If there is still time remaining on the grinding clock, the grinding step (178) is repeated.

When the run-out and conicity grinding are completed, the variations in the tire's force values for the various circumferential increments are compared with the acceptable force variation limits (184) (FIG. 1). If the force variation is acceptable the force correction steps are by-passed and the grinding wheels and run-out probes are retracted (176). If the force variation is not acceptable, the variation is compared with maximum values above which it is considered not worthwhile to correct the tire (186) (FIG. 13). If the force variation is above these maximum values, the correction is terminated and the grinding wheels and run-out probes are retracted (176) (FIG. 11).

If the variation in the force values is within the range in which it is worthwhile to correct the tire, the speed of the motor 4 rotating the tire T (FIG. 1) is reduced to an optimum speed below 60 RPM for force variation correcting the tire (188) and the required grinding depths are calculated by the computer 20 (190). Using these grinding depths, the computer 29 directs the stepper motors 28 and 30 to position the grinding wheels in their proper positions for reducing the force values in each increment of the tire circumferences that needs correction (192). During this correction the force variation values are continuously monitored by the computer 20 (194), and if the grinding depths need to be reset (196) and the depths which are needed for correction are below the maximum permissible depths for grinding (198) the grinding depths are reset (200) and the grinding to correct the force variation (192) continues. When the measured force variation that is being monitored is reduced to its limits of acceptability, the tire speed is increased back to 60 RPM (202) and the force variation is checked at this higher speed (204).

Following the force variation correction, the grinding wheels 32 and 34 and run-out probes 14 are retracted (176). Preferably, the computer calculates the location of the peak of the first harmonic of the radial force variation pattern of the corrected tire and a marking device marks the tire at this point (206). The motor 4 then reverses the direction of rotation of the tire (208) and tests the force variation of the tire at 60 RPM (210). The computer determines the tire grade and sets the markers for subsequent marking (212) and then the speed of the tire is reduced until the tire stops rotating (214). The motor 10 retracts the load wheel (216), the tire is deflated (218), removed from its chuck (220 and 222) and conveyed to a marking station (224) for tire grade marking (225). The tire is then conveyed through an exit gate (228) for appropriate disposition according to the grade it receives.

While several embodiments of the present invention have been shown and described, modifications and additions may of course be made without departing from the scope of the following claims.

We claim:

1. A method of improving the uniformity of a tire as affected by variations in forces generated in the tread area of the tire while the tire rotates under load against a surface, including the steps of measuring the magnitudes and locations of the force variations and cutting material from the tread surface in response to these measurements, wherein the improvement comprises,
   (a) calculating from the measured force variation magnitudes and locations the depth of cutting required in each of a plurality of incremental segments of the tire circumference;
   (b) measuring the radial run-out of the tire,
   (c) in response solely to the radial run-out measurement and cutting depth calculations, moving a cutting device while the tire is rotating to locate the cutting device at the calculated cutting depth relative to the run-out measurement at each increment of the tire circumference.

2. The method according to claim 1 wherein the step of measuring the magnitude and locations of the force variations is performed while the tire is rotating at 60 revolutions per minute and the step of moving the cutting device toward and away from the tread surface is carried out while the tire is rotating at a speed which is substantially less than 60 revolutions per minute and is determined to be the best speed for improving the uniformity of the particular tire based on its tread diameter, tread design and tread material characteristics.

3. The method according to claim 2 wherein the force variation of the tire is measured after all incremental segments of the tire have been cut to the depth required by the calculation step and if the tire is within the maximum limits of radial force variation, the cutting of the tire tread is terminated, but if the force variation of the tire is still above the maximum allowable limit, then repeating the calculating step (a), run-out measuring step (b) and cutting step (c).

4. The method according to claim 2 wherein the step of cutting material from the tread surface is carried out by cutting at a maximum allowable depth during successive rotations of the tire until the required depth of cut in each increment of the tire circumference is obtained.

5. The method according to claim 4 wherein the maximum allowable cutting depth during successive rotations of the tire is determined by the amount of material remaining to be removed from the increment to obtain the required total depth of cutting, with a greater maximum allowable cutting depth for each rotation of the tire being allowed when the total amount of material to be removed is relatively large, and lesser, finishing depths of cutting being allowed as the depth of material remaining to be cut becomes less.

6. The method according to claim 5 wherein the force variation of the tire is measured after all increments of the tire circumference have been cut to the depth required by the calculation step and if the tire is below the maximum limit of force variation, the cutting of the tire tread is terminated, but if force variation of the tire is still above the maximum allowable limit, then repeating the calculating step (a), run-out measuring step (b) and cutting step (c).

* * * * *